UNITED STATES PATENT OFFICE.

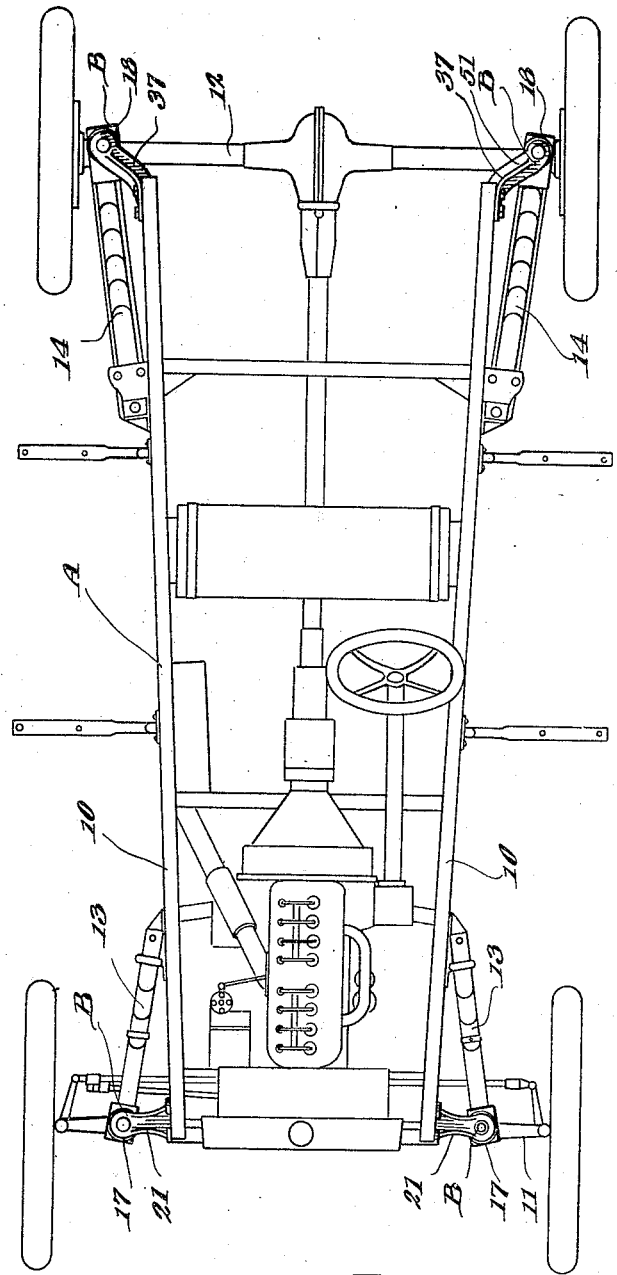

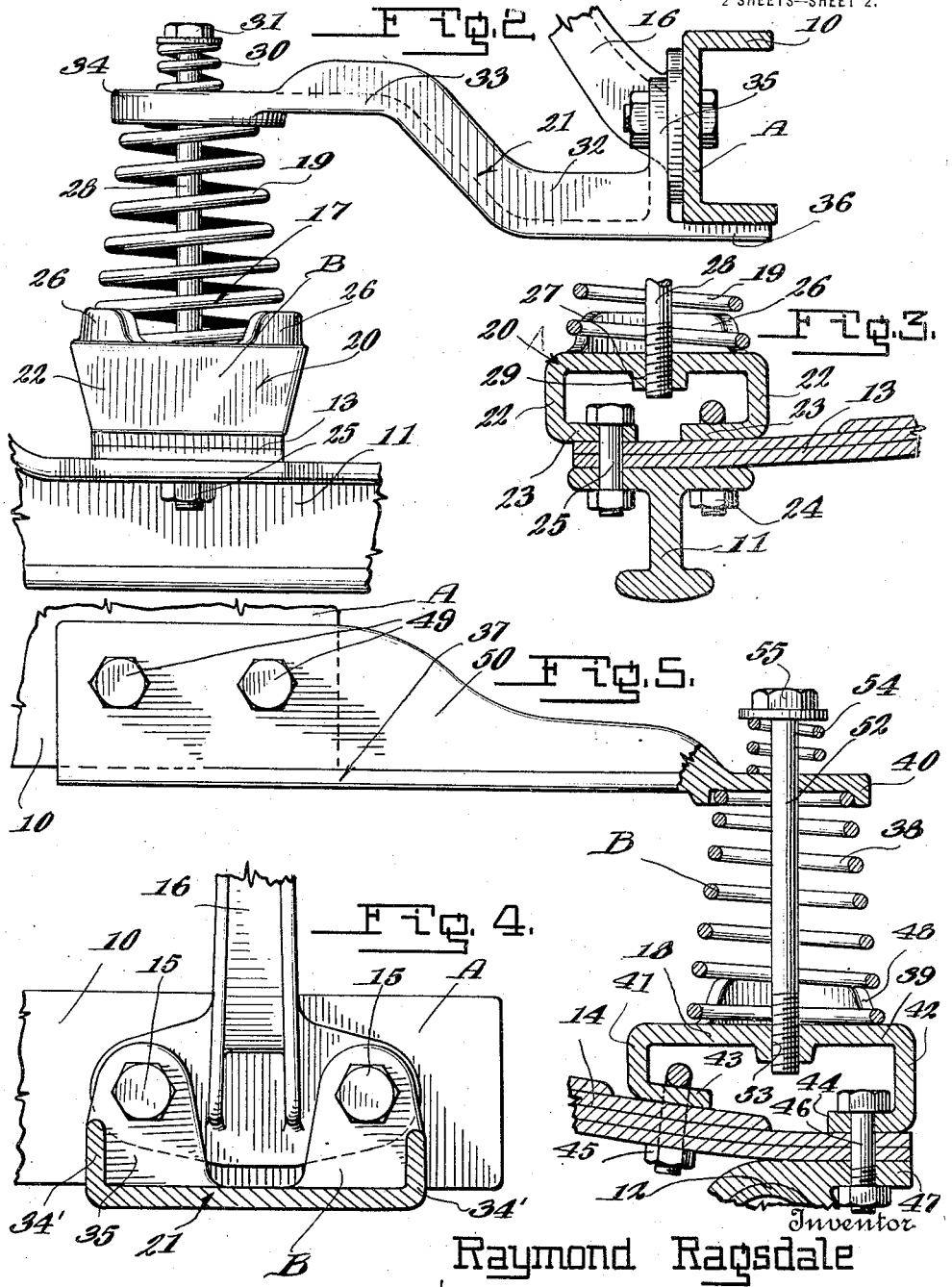

RAYMOND RAGSDALE, OF PORTERVILLE, CALIFORNIA.

SHOCK ABSORBER.

1,427,327. Specification of Letters Patent. Patented Aug. 29, 1922.

Application filed March 8, 1920. Serial No. 363,955.

*To all whom it may concern:*

Be it known that I, RAYMOND RAGSDALE, a citizen of the United States, residing at Porterville, in the county of Tulane and State of California, have invented certain new and useful Improvements in Shock Absorbers, of which the following is a specification.

This invention relates to vehicle attachments, and the primary object of the invention is to provide an improved shock absorber to be used in connection with the ordinary vehicle springs to effectively eliminate the transmission of shocks incident to the travel of a vehicle over a rough road to the vehicle body and for preventing the rebounding of the vehicle springs after the shock.

Another object of the invention is to provide an improved shock absorber so constructed as to eliminate strain on the spring bolts and on the vehicle springs and thereby prevent the sheering of the spring bolts and the sagging of the vehicle springs.

A further object of the invention is the provision of an improved shock absorber embodying supplemental springs and an improved means for connecting springs to the vehicle frame and to the vehicle axles at the point where the vehicle springs attach thereto.

A still further object of the invention is to provide an improved shock absorber for vehicles, of the above character, which is durable and efficient in use, one that is simple and easy to manufacture, one which can be placed upon the market at a reasonable cost and installed on a vehicle without necessitating the help of a skilled mechanic.

With these and other objects in view, the invention consists of the novel construction and arrangement and formation of parts as will be hereinafter more specifically described, claimed and illustrated in the accompanying drawings, forming a part of this specification and in which drawings:

Figure 1 is a plan view of the motor vehicle chassis showing the improved shock absorber applied thereto.

Figure 2 is a fragmentary transverse section through the vehicle chassis adjacent to the forward end thereof showing the improved shock absorbers applied thereto, the shock absorber being shown in elevation.

Figure 3 is a detail vertical longitudinal section through the lower end of the shock absorber showing the means of attaching the same to the vehicle spring and axle.

Figure 4 is an enlarged fragmentary transverse section through the upper bracket for attaching the shock absorber to the vehicle chassis, and Figure 5 is a fragmentary side elevation of a vehicle chassis showing the rear axle and spring in section, and showing the improved shock absorber attached thereto, the shock absorber also being shown in section.

Referring to the drawings in detail, wherein similar reference characters designate corresponding parts throughout the several views, the letter A indicates a motor vehicle chassis and B the improved shock absorber therefor.

The motor vehicle chassis A may be of the ordinary or any preferred type, and as shown includes the longitudinal side channel beams 10, the front and rear axles 11 and 12, the partial elliptical front and rear springs 13 and 14, which connect the front and rear axles respectively with the channel side beams 10. The side beams 10 adjacent to the forward ends thereof has secured thereto by suitable bolts 15 the usual upwardly and outwardly extending curved fender supporting brackets 16.

The improved shock absorbers B are arranged in pairs at the forward and rear ends of the chassis A and the numeral 17 indicates the front shock absorbers and 18 the rear shock absorbers.

The front shock absorbers 17 include the relatively heavy coil springs 19, the convolutions of which gradually decrease in diameter toward the upper ends thereof, and the springs 19 are connected to the axle 11 by suitable brackets 20 and to the side channel beams 10 by an upper bracket 21. The lower attaching bracket or clip 20 is substantially U shaped in cross section and the depending legs 22 thereof are provided with inwardly extending flanges 23 which are adapted to engage the upper surface of the springs 13 adjacent to the outer edges thereof. One of the legs 22 of the clip or bracket 20 may be formed relatively shorter than the other so as to conform to the inclination of the supporting spring.

The inwardly extending flange 23 formed on the rear leg 22 of the U-shaped bracket 20 is positioned under the U-shaped spring attaching clip 24, which prevents the accidental displacement of the clip. The flange 23 formed on the forward leg 22 of the clip is provided with a suitable aperture for the reception of the spring fastener 25, which extends through the front axle 11, the springs 13 and the flange 23. The upper surface of the clip or bracket 20 is provided with oppositely disposed upwardly extending substantially semi-circular lips 26 which form retaining flanges for the lower ends of the supporting coil springs 19. The central portion of the clip or bracket 20 is provided with a screw threaded bore 27, in which is adapted to be threaded a retaining bolt 28 for the supporting coil spring 19. The clip or bracket 20 is reinforced as at 29, where the bolt 28 passes through the same. If so desired a suitable nut (not shown) may be threaded on the lower end of the bolt. The bolt 28 extends centrally through the spring 19 and is slidably mounted through an aperture formed in the upper attaching bracket 21, and a suitable rebounding spring 30 may be coiled around the bolt 28 and interposed between the upper surface of the bracket 21 and the head 31 of the bolt 28. The upper attaching bracket 21 includes an outwardly extending arm 32 having the upwardly extending offset angular end 33 which carries the circular cup-shaped spring receiving member 34. The bracket 21 is preferably provided with reinforcing strengthening flanges 35' as clearly shown in Figure 4 of the drawings. The inner end of the attaching bracket 21 is provided with a pair of spaced upwardly extending attaching feet 35 which straddle the fender supporting brackets 16 and these feet or lugs are held in place by the fender attaching bolts 15. Directly below the attaching feet or lugs 35 is formed an inwardly extending flange 36, which engages the lower surface of the channel side beams 10 and prevents turning movement of the brackets 21 in relation to the channel beams.

Thus it will be seen that additional shock absorbing spring is provided for the chassis at the forward end thereof at the point where the forward elliptical springs attach to the front axle. This effectively prevents the transmission of shock to the motor vehicle body and forms an additional support for the body and relieves a portion of the weight of the body from the usual springs 13. The rear shock absorbers 18 are formed similar to the front shock absorbers, and the difference mainly consists in the configuration of the upper attaching brackets 27 thereof which are shaped so as to conform to the configuration of the rear end of the chassis. The rear shock absorbers 18 each include the relatively heavy coil springs 38, the lower attaching brackets or clips 39 and the upper attaching brackets 37. The springs 38 have the convolutions thereof gradually decreased in diameter toward their upper ends and the upper convolutions of the springs are fitted in suitable cup-shaped members 40 formed on the terminals of the upper supporting brackets 37. The lower attaching brackets or clips 39 is substantially U-shaped in cross section and is arranged on the upper surface of the rear edge of the springs 14 and the same includes the depending legs 41 and 42 having the inwardly extending flanges 43 and 44 formed thereon. The leg 41 is formed relatively shorter than the leg 42 so as to compensate for the difference in the thickness of the spring 14 at this point. The flange 43 formed on the leg 41 is secured in place by means of the usual U-shaped spring attaching clip or clevis 45. The flange 44 formed on the leg 42 is held in place by the spring attaching bolt 46 which extends through the flange, the spring 14 and the lug 47 formed on the rear axle housing. The upper surface of the attaching bracket or clip 39 is also provided with the oppositely disposed upwardly extending arcuate lips 48, which form a retaining cup or flanges for the lower end of the spring 38. The upper supporting brackets 37 are secured to the rear terminals of the longitudinal channel beams 10 by a suitable fastening bolt or the like 49 which extends through the upwardly extending bracing flange 50 formed on the brackets. The outer terminals of the supporting bracket 37 is bent outwardly and rearwardly as at 51 toward the rear ends of the springs 14, as clearly shown in Figure 1 of the drawings, and these brackets terminate directly above the lower brackets or clips 39. The springs 38 are held in position between the brackets 37 and 39 by a suitable rebound bolt 52 which extends longitudinally through the spring. The lower ends of the bolts are threaded into threaded bores 53 formed in the lower attaching brackets 39 and the brackets are at this point enlarged, so as to prevent weakening thereof by the bore. If so desired a suitable nut may be turned on the lower end of the bolt. The upper end of the rebound bolt 52 extends above the upper surface of the upper attaching or supporting bracket 37 and has coiled around the same a suitable rebound spring 54, which is arranged between the upper surface of the bracket 37 and the head 55 of the bolt 52.

The functions of the rear shock absorber are identical with the functions of the forward shock absorber, and the same effectively prevent the rear springs 14 from sagging by relieving a portion of the weight of the vehicle body therefrom and these absorbers effectively prevent the transmission of shock from the rear wheels to the body.

From the foregoing description it can be seen that an improved shock absorber is provided for motor vehicles which are exceedingly simple and durable in construction and which may be readily attached to motor vehicles now on the market.

Changes in details may be made without departing from the spirit or scope of my invention; but,

I claim:

1. The combination with a vehicle chassis including a frame, front and rear axles, and leaf springs connecting the axles with the frame, of shock absorber for the chassis including coil springs arranged in direct alignment with the axles at the point of attachment of the leaf springs thereto, means connecting the lower ends of the coil springs with the leaf springs and axles, and laterally extending brackets carried by the frame and receiving the upper edge of the coil springs.

2. The combination with a vehicle chassis including a frame, front and rear axles, and leaf springs connecting the axles with the frame, of a shock absorber for the chassis including coil springs arranged in direct alignment with the axles at the point of attachment of the leaf springs thereto, brackets secured to the springs, an axle, coil springs secured to the brackets, laterally extending supporting arms secured to the vehicle frame and receiving the upper terminals of the coil springs, and bolts extending through the frame, and the attaching brackets and supporting arms.

3. The combination with a vehicle chassis including a frame, front and rear axles, and leaf springs connecting the axles with the chassis, of a shock absorber for the chassis including coil springs having the convolutions thereof decreasing in diameter toward their upper ends, brackets secured to the axles and to the leaf springs, retaining flanges formed on the brackets and arranged to engage the outer surface of the coil springs, laterally projecting supporting arms carried by the frames and arranged directly above the coil springs, the arms having cups formed in the outer terminals thereof arranged to receive the springs, and bolts slidably carried by the supporting arms and extending through the frames and secured to the attaching brackets.

4. The combination with a frame and axle of quarter elliptic leaf springs secured to the frame and axle at their respective ends, coil springs, an extension member carried by the frame to which one end of said coil springs is secured, and securing means carried on the axle for the other end of said coil springs, said coil springs cooperating with said leaf springs in absorbing shock.

RAYMOND RAGSDALE.